Figures 1, 2, 3, 4, 5, 6, 7, 8:
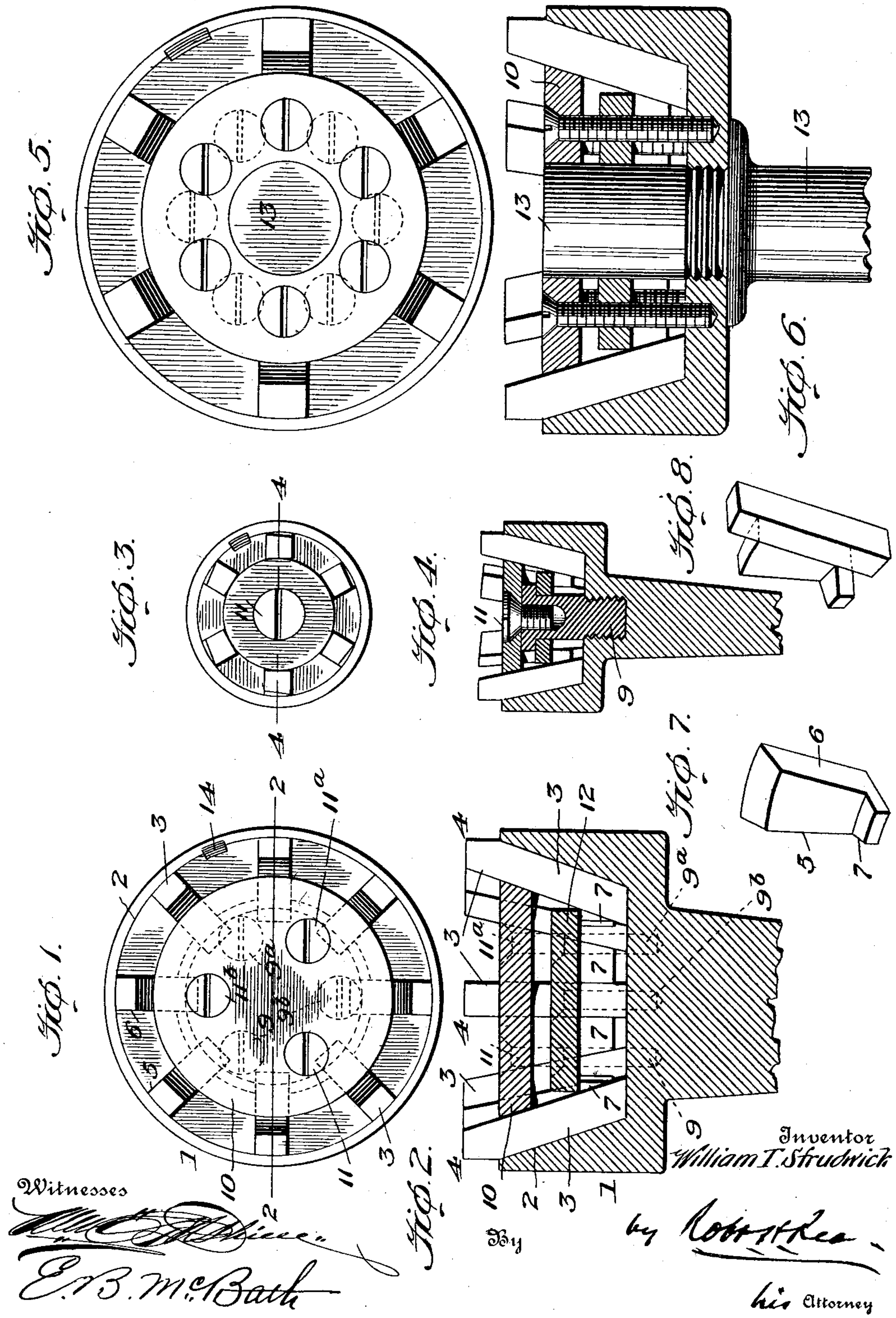

W. T. STRUDWICK.

MILLING TOOL.

APPLICATION FILED JUNE 2, 1913.

1,071,479. Patented Aug. 26, 1913.

Witnesses

[signature]

E. B. McBath

Inventor

William T. Strudwick

By Robert Lea his Attorney

COLUMBIA PLANOGRAPH CO., WASHINGTON, D. C.

UNITED STATES PATENT OFFICE.

WILLIAM T. STRUDWICK, OF MINNEAPOLIS, MINNESOTA.

MILLING-TOOL.

1,071,479. Specification of Letters Patent. Patented Aug. 26, 1913.

Application filed June 2, 1913. Serial No. 771,229.

*To all whom it may concern:*

Be it known that I, William T. Strudwick, a citizen of the United States, residing at Minneapolis, in the county of Hennepin and State of Minnesota, have invented new and useful Improvements in Milling-Tools, of which the following is a specification.

This invention relates to face milling tools the object being to provide a cutter in which the blades of slightly different thickness may be held and clamped, and may be used and exchanged rough finished, without special fitting by accurate grinding to micrometer gage, and may be quickly replaced by fresh blades when worn, and securely seated in the holder without possibility of chattering.

My cutter is principally designed for use in metal working, but as will hereinafter be apparent to those skilled in the arts may also be applied without change to dressing softer or harder materials.

The distinguished feature of my invention comprises a series of removable blades or cutters supported in a cup-shaped holder and a plurality of wedge-shaped spacers intervening between the several cutters capable of being drawn into a tight fit in the annular holder by an adjustable clamp disk or ring which interlocks with the lower part of the several wedges and draws them into snug and firm engagement with the cutters and wall of the holder; I also provide an additional lock disk or ring to clamp the parts at an outer point of the cutters to make a solid and non-chattering engagement. The assembly of the parts is thus made easy and rapid.

The invention therefore comprises a milling tool with a cupped mouth, a plurality of cutting blades with intervening wedges, and means for drawing the wedges longitudinally to lock the cutters in the holder and relatively to the wedges.

It comprises also more detailed features which will be hereinafter more fully described and will be definitely indicated in the appended claims.

In the accompanying drawing which illustrates my invention, Figures 1 and 2 are plan and section on the plane 2—2 of Fig. 1, representing one form of the invention; Figs. 3 and 4 are similar views of a modification, the section being taken on a like plane 4—4 of Fig. 3; Figs. 5 and 6 are similar views of a tool designed for heavier work; and Figs. 7 and 8 are isometric projections showing the wedge and its relation to a coöperating cutter.

I preferably use a holder provided with a conical or converging mouth the inner wall of which forms a taper seat for the cutters and their coöperating wedges. The holder and its cavity are indicated at 1 and 2.

3 represents a group of milling cutters of tempered steel and of cylindrical or prismatic shape each provided with a cutting edge of appropriate bevel for the work in hand, indicated at 4. The wedges having sloping walls 5, 6, see Fig. 7. The bottom of the taper recess in the cup is a plane surface and the cutters are shaped so that their feet bear solidly against this surface as a support. I preferably employ two clamp members, the lower one bearing on the wedge flanges or offsets 7. The wedge is so graduated in width that when assembled with the cutters a free space will be left below them to permit longitudinal adjustment relatively to the blades and the holder, see Figs. 3, 4, and 8. One or more short adjusting screws 9, $9^a$, $9^b$ loosely fitting the disks permit the wedges to be drawn snugly against the cutters and the holder thus contracting the group in the circular opening in the holder which is solidly filled, since the adjustment of the screw or screws 9, $9^a$, etc., draws down the disk and the wedges, thereby reducing the diameter of the group and locking the lower parts of the blades without possibility of shifting. The clamping effect would follow with a cylindrical cup in the holder since a taper inner face of the blade would also permit it to be secured by a sliding engagement of the disks with said face, but I prefer to make the cup tapered as it permits the cutters to spread over a larger circle in a moderate size of holder. I prefer to employ also an outer lock member 10. In a moderate size of tool this is a simple disk with a sloping wall to snugly engage the blades and wedges, and may be drawn into snug engagement by one or more lag screws, 11, $11^a$, $11^b$. This disk, as will be apparent, firmly locks an outer point of the blade and prevents any tendency to chatter. In the smaller size tool a single screw will be sufficient; such a construction is shown in Figs. 3 and 4. The screw or bolt with a square or hexagonal head serves to draw the wedges and blades snug, the screw 11 taking into a thread cut in the head of the bolt 9. In Figs. 5 and 6, representing a tool designed for the heaviest work greater strength and power may be afforded by employing a greater number of screws; I have shown six for each clamp ring 10, 12. In this form I provide a shaft 13 not integral with the holder which is adapted to screw into the latter and is provided with a mandrel which snugly fits the clamp rings and guides them true when adjusted.

Thus it will be seen that I provide a tool very easy to assemble and one which is rendered universal by the ease with which blades of varying size and rough finish may be used. In standard types of milling tools the blades must be finished and ground to micrometer gage and are usually provided with independent adjusting means for each cutter. In my organization the longitudinally adjustable clamp disks or rings permit variations in the thickness of the blades, therefore blades having only a rough finish may be used.

I preferably employ a key 14, to lock the cutter system solidly against circumferential slipping. More than one of these keys may be employed. In adjusting the cutters, it will be apparent that the several wedges and blades will shift circumferentially by increments as the screws are advanced only the point where the key or keys are placed remaining stationary; therefore the parts gradually approach a snug relation until they become into close engagement where all is solid. Notwithstanding the blades may be rough and not finished accurately to gage, there is abundant latitude to bring them into tight engagement with the wedges and holder and to hold them when at work solidly in their seats. The work of assembling is very quick. When a tool is worn it may be removed from the lathe or milling machine and fresh blades taken from stock and inserted in less than two minutes, thereby minimizing the time loss in the use of the machine and resulting in a great saving in cost of factory production.

My tool may be employed wherever face milling or cutting is required, and with suitable shapes of blades can be used for face finishing or ornamentation, as in rosette work or the like.

Having thus described my invention what I claim as new and desire to secure by Letters Patent is:

1. A milling tool comprising a cupped holder and a plurality of removable cutting blades with intervening wedges in said holder, and means for adjusting the wedges as a group longitudinally of the cup.

2. A milling tool comprising a cupped holder, a plurality of removable cutting blades in said holder, wedges between the several blades, and a movable clamp disk engaging the wedges movable lengthwise of the cup.

3. A milling tool comprising a cupped holder, a plurality of removable cutting blades in said holder, intervening wedges between the several blades, an adjustable clamp disk for drawing the wedges to a smaller circle, and a lock disk engaging another point of the blades to secure them solidly in place.

4. A milling tool comprising a cupped holder, a plurality of cutting blades in said holder, adjustable wedges intervening between the cutters each provided with an offset, and a clamp disk to engage and shift the wedges to lock the blades solidly in place.

5. A milling tool comprising a cupped holder, a plurality of cutting blades in said holder, an adjustable wedge intervening between the several blades, each of said wedges having an offset, and an adjustable clamp disk engaging the offsets to shift the wedges and clamp the blades.

6. A milling tool comprising a holder with a conical mouth or cavity, a plurality of cutting blades in said holder having their feet bearing on the bottom of the cavity, a plurality of adjustable wedges with walls adapted to engage the blades said wedges each having an offset near its base, a clamp disk engaging the offsets and a second disk to lock the blades at a second point.

7. A milling tool comprising a holder having a conical mouth or cavity, a plurality of cutting blades in said holder having their feet bearing on the bottom of the cavity, a plurality of wedges with walls adapted to engage the several blades, said wedges each having an offset near its base, a lock disk engaging the offsets, and screws to drive the cutters and wedges into firm engagement with the holder and with one another.

8. A milling tool comprising a holder provided with a cupped mouth, a plurality of cutting blades supported in the holder, longitudinally adjustable wedging means adapted to shift and lock the blades in the holder, and a key interlocking with the holder and the blades and wedging means.

WILLIAM T. STRUDWICK.

Witnesses:
E. A. Hobbs,
Helen Ellis.

Copies of this patent may be obtained for five cents each, by addressing the "Commissioner of Patents, Washington, D. C."